(12) United States Patent
Wilczek (10) Patent No.: US 6,948,383 B2
(45) Date of Patent: Sep. 27, 2005

(54) WIDE ANGLE ROTATION ANGLE SENSOR (75) Inventor: Klaus Wilczek, Werne (DE)

(73) Assignee: AB Eletronik GmbH, Werne (DE)

(*) Notice: Subject to any disclaimer, the term of this patent is extended or adjusted under 35 U.S.C. 154(b) by 75 days.

(21) Appl. No.: 10/458,960

(22) Filed: Jun. 11, 2003

(65) Prior Publication Data
US 2004/0261546 A1 Dec. 30, 2004

(30) Foreign Application Priority Data
Jun. 12, 2002 (DE) .......................... 102 26 062

(51) Int. Cl.$^7$ .............................. G01L 3/02; G01L 3/10
(52) U.S. Cl. .............................. 73/862.332; 73/862.331
(58) Field of Search ................. 73/862.331, 862.332, 73/862.333, 862.335; 324/207.2, 207.22, 207.25

(56) References Cited

U.S. PATENT DOCUMENTS

| 4,107,601 | A | | 8/1978 | Barmeier, Jr. et al. |
| 5,861,745 | A | * | 1/1999 | Herden ................. 324/207.2 |
| 6,275,025 | B1 | * | 8/2001 | Wiese ................. 324/207.2 |
| 6,283,150 | B2 | * | 9/2001 | Apel et al. ............ 324/207.25 |

FOREIGN PATENT DOCUMENTS

| DE | 196 30 764 A1 | 4/1997 |
| DE | 196 34 281 A1 | 2/1998 |
| DE | 197 16 985 | 10/1998 |
| DE | 197 26 691 A1 | 1/1999 |
| DE | 199 03 940 C1 | 2/1999 |
| DE | 197 53 776 A1 | 6/1999 |
| DE | 100 54 123 A1 | 5/2001 |
| DE | 100 55 288 A1 | 5/2001 |
| EP | 0 457 033 B1 | 11/1991 |
| EP | 1 024 267 A2 | 8/2000 |
| WO | WO 91/12423 | 8/1991 |
| WO | WO 95/14901 | 6/1995 |
| WO | WO 95/14911 | 6/1995 |
| WO | WO 98/25102 | 6/1998 |

* cited by examiner

Primary Examiner—Edward Lefkowitz
Assistant Examiner—Lilybett Martir
(74) Attorney, Agent, or Firm—Milde & Hoffberg, LLP (57) ABSTRACT For simpler manufacture of a rotation angle sensor and to utilize as much of its angle expansion as possible, the partial stator elements are in the shape of a partial ring split into a large partial stator element (22.1) and a small partial stator element (22.2) with tangentially arranged spacing openings (4, 5) located between them. The large partial stator element (22.1) covers a range of greater than 180° and the small partial stator element a range of less than 180° of a circular arc. The large and small stator elements (22.1, 22.2) are at least partially molded into one of the parts made of a magnetically non-conducting material. A magnet element consists of two magnetically bipolar partial magnet segment elements that are essentially of the same length and cover 90° or more of a circular arc.

25 Claims, 12 Drawing Sheets

WIDE ANGLE ROTATION ANGLE SENSOR

BACKGROUND OF THE INVENTION

The invention relates to a device for the contact-free measurement of rotary movements of components moving relative to one another, with a stator unit consisting of two asymmetrically built partial stator elements that leave empty two spacing openings between them, where at least one Hall unit is located in at least one spacing opening, and where the partial stator elements are split in the shape of a partial ring into a large partial stator element and a small partial stator element, whereby the large partial stator element covers a range of greater than 180° and the small partial stator element of less than 180° of a circular arc, and a rotor unit consisting of a magnet element that is supported by a magnet support element and that can be moved relative to the stator elements while maintaining an air gap, whereby the magnet element consists of two magnetically bipolar magnet segment elements that are at least partially arranged in a first part made of a magnetically non-conducting material.

In addition, the invention relates to a device for monitoring an alterable operating parameter.

A device of the type mentioned above is known from DE 196 30 764 A1, where this device consists of a partial stator element that stretches across 240° and an additional partial stator element that stretches across 120°. Two radially oriented openings are located between the two partial stator elements. A Hall unit is located in one of the openings. A movable magnet element is located in the partial stator elements. Maintaining an air gap, a rotor unit with a bipolar magnet element is arranged in the two partial stator elements. The magnet element consists of two partial magnet elements with differing lengths. One partial magnet element can exhibit an angle range of greater than 180°. The magnet element is embedded in a synthetic compound.

The disadvantage of this device is that the manufacturing process for the radially oriented openings is very elaborate. In addition, the polarity of the magnet elements does not permit a full utilization of the angle magnification. The linearity of the output signal is negatively influenced due to the uneven lengths of the partial magnet elements of the magnet element.

Known from WO 95 14 911 A1, is the manufacture of the partial stator elements of stacks of sheet metal consisting of textured sheet metal. However, the individual sheets are provided with openings and are held together using an appropriate device. The profile of the magnetic flux is altered by the openings.

DE 100 54 123 A1 shows a rotation angle sensor where the stator elements are also built up from sheet metal stacks. Hall ICs are located in spacing openings between the partial stator elements and are offset from one another by 180°. Via input and output terminals, the Hall ICs are connected to a connector unit. However, the rotation angle sensor is only capable of measuring angles between 0° and 90°.

Monitoring an alterable operating parameter is known from both EP 0 457 033 B1 and WO 91 12 423 A1. They employ measuring devices that are designed with a combined power supply.

Disadvantageous is the fact that resistor combinations have been employed as the measuring devices. Because the resistor values need to be tapped and the resistance tracks as well as the taps encounter wear or even damage in the process, they are not entirely dependable for their monitoring function.

Known from DE 196 34 281 A1 is a rotation angle sensor with a stator unit that consists of three stator elements. A measuring element is located in an opening between two stator elements with a magnet element moving around said stator elements. The opening can be arranged tangentially. To achieve a measuring range of 110°, the third stator element must, however, be connected in a magnetically conducting manner with one of the other two stator elements.

Known from U.S. Pat. No. 4,107,601 is the arrangement of bars of a magnetic material at a rotor shaft using a flexible strip. However, this strip is used only to press the bars in a spaced manner to the shaft.

As a rule, rotation angle sensors allow for the measurement of angles between 0° and 90°.

Such a rotation angle sensor is known from WO 95 14 901 A1. It consists of a stationary and of a rotating formation. The stationary formation includes two crescent-shaped stator elements with a spacing opening between them and a Hall element located in said opening. The rotating formation exhibits a magnet element designed in a ring shape that is supported by a support unit and that can be moved around the stator element while maintaining an air gap.

Rotation angle sensors are also known to the applicant from WO 98 25 102 A1, DE 197 16 985 A1, DE 199 03 940 A1 and EP 1 024 267 A2.

SUMMARY OF THE INVENTION

It is the principal objective of the present invention to advance the development of a rotation angle sensor of the type mentioned above such that it can be manufactured easily and that it utilizes a maximum possible angle extension. An additional objective is to provide the rotation angle sensor for a specific application.

This objective, as well as other objectives which will become apparent from the discussion that follows, are achieved, in accordance with the present invention, by providing a contact-free, wide angle, rotation angle sensor having the following components:

(a) a stator unit comprising two asymmetrically built partial stator elements that leave empty two spacing openings between them, the partial stator elements being split in the shape of a partial ring into a large partial stator element and a small partial stator element, wherein the large partial stator element covers a range of more than 180° and the small partial stator element a range of less than 180° of a circular arc, (b) at least one Hall sensor located in at least one spacing opening, and (c) a rotor unit comprising a magnet element that is supported by a magnet support element and that can be moved relative to the stator elements while maintaining an air gap, wherein the magnet element comprises two magnetically bipolar magnet segment elements that are at least partially arranged in a first part made of a magnetically non-conducting material.

According to the invention:

(1) the two spacing openings are arranged tangentially between the large partial stator element and the small partial stator element, (2) the large and the small partial stator elements are at least partially molded into a second part that is made of a magnetically non-conducting material, and (3) the magnet element comprises two essentially equally long magnetically bi-polar partial magnet segment elements that each cover a range of 90° or more, wherein the partial magnet segment elements are at least partially molded into the first part.

The advantages accomplished with the invention consist primarily in that the two partial stator elements can be manufactured more easily due to the particular design of the spacing openings. Furthermore, through the tangential arrangement of the spacing openings and the two bipolar magnet segments having the same length, a split of the magnetic flux is enabled such that its profile is essentially linear in an extended range. Through the two measures, it is possible to measure an angle without interruption in an extended range. Both spacing openings can be arranged in one plane or offset at essentially cylindrical partial stator elements.

The partial stator elements are split asymmetrically, whereby the large partial stator element covers a range of greater than 180°, preferably between 200° and 280° of a circular arc and the small partial stator element a range of smaller than 180°, preferably between 80° and 160° of a circular arc. Proven to be particularly suitable has been a stretch of the large partial stator element covering about 240° and of the small partial stator element covering about 120°. The partial magnet segment elements cover an angle range of greater than 90°, preferably 90–140° and particularly preferred an angle of about 120°. Using a sensor designed in this manner, an angle between −120° and +120° can be measured linearly.

The advantages accomplished with the method according to the invention are that alterable operating parameters can be monitored reliably by using the device with the two ASIC circuit elements. Of particular advantage is here the design of the device and the great angle range of, for example, 0° to 120° at a high linearity.

For a full understanding of the present invention, reference should now be made to the following detailed description of the preferred embodiments of the invention as illustrated in the accompanying drawings.

DESCRIPTION OF THE PREFERRED EMBODIMENT

The preferred embodiments of the present invention will now be described with reference to FIGS. 1–6 of the drawings. Identical elements in the various figures are designated with the same reference numerals.

Figure 1:
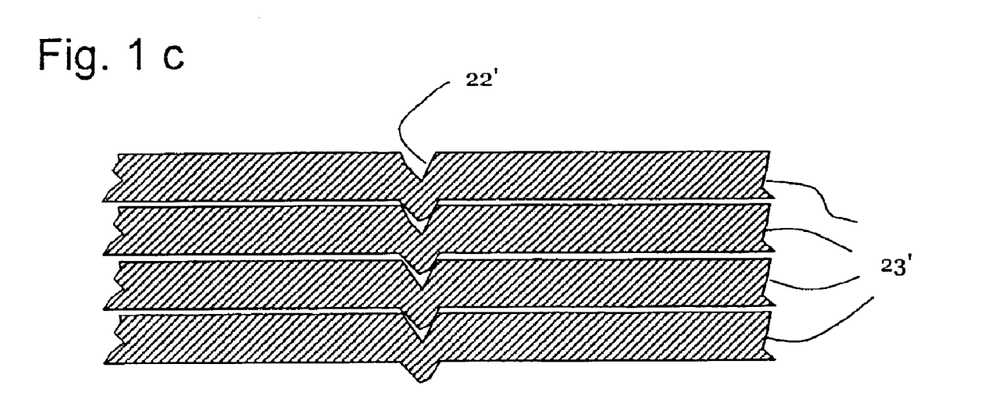
FIG. 1a is an exploded, schematic, perspective view of a first design of a stator unit of a wide-angle rotation angle sensor.
FIG. 1b is an exploded, schematic, perspective view of a second design of a stator unit of a wide-angle rotation angle sensor.
FIG. 1c is a schematic sectional view of a part of a stator element from FIG. 1b.
Figure 1A:
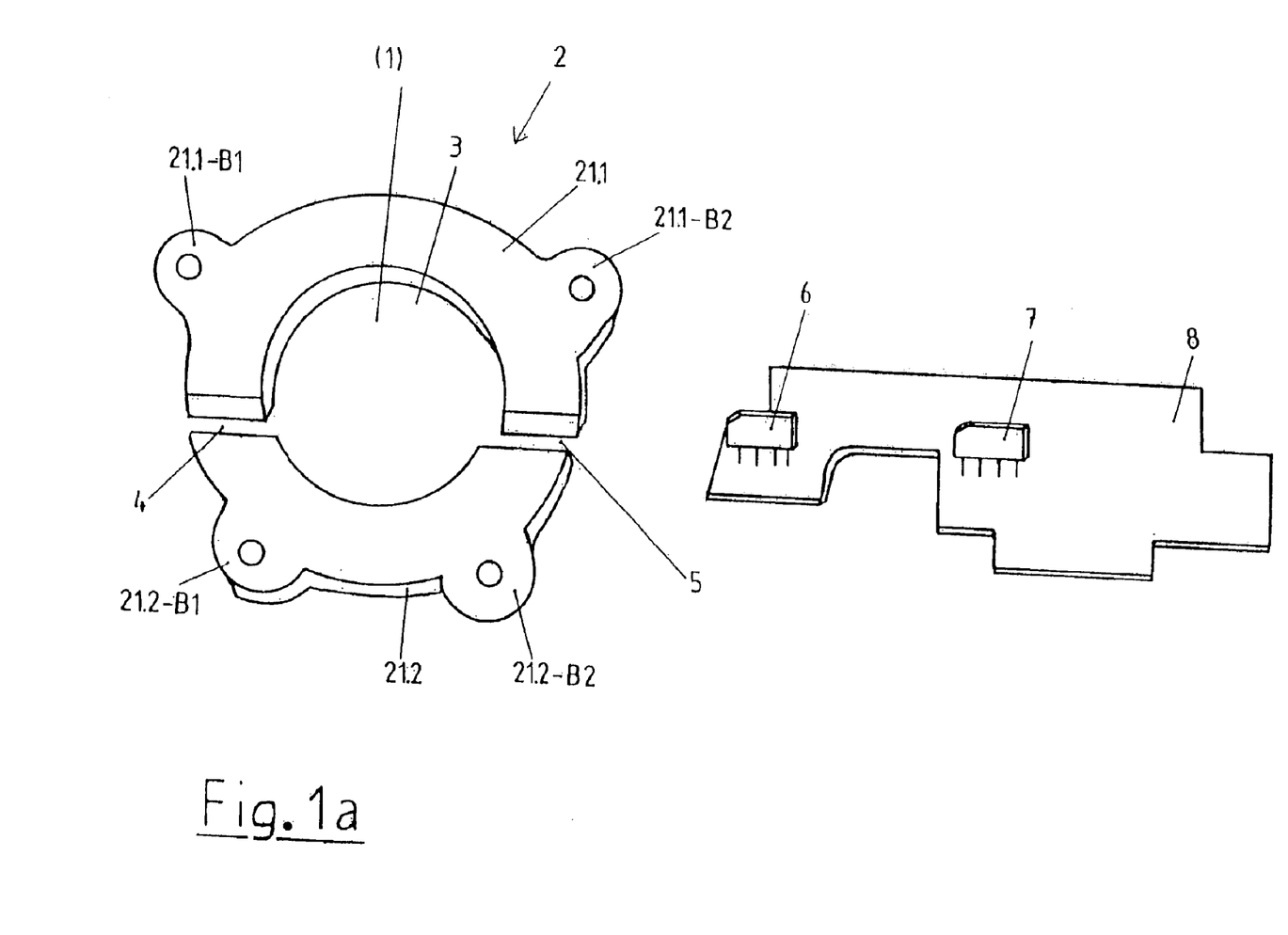
Figure 1B:
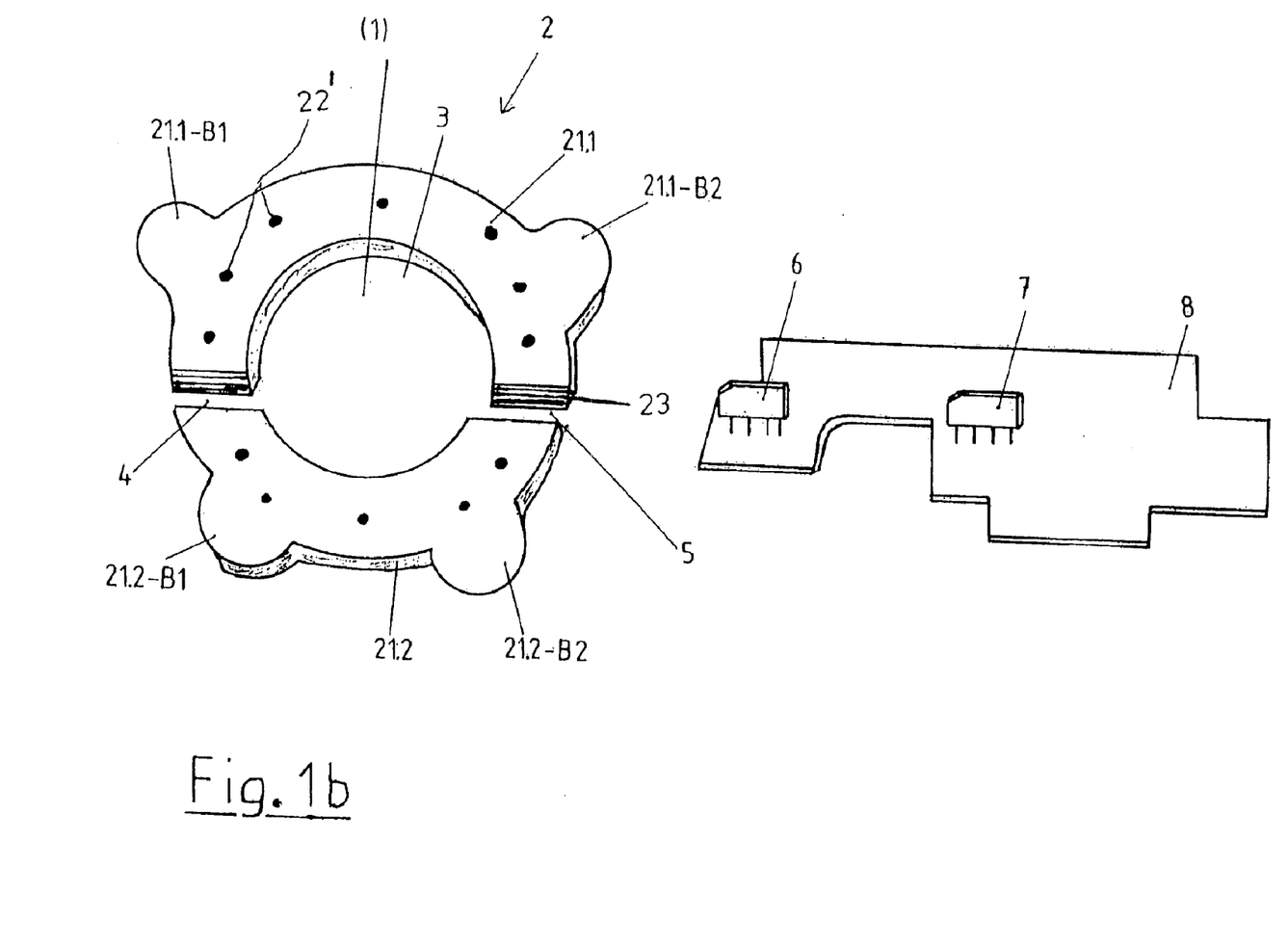
Figure 2A:
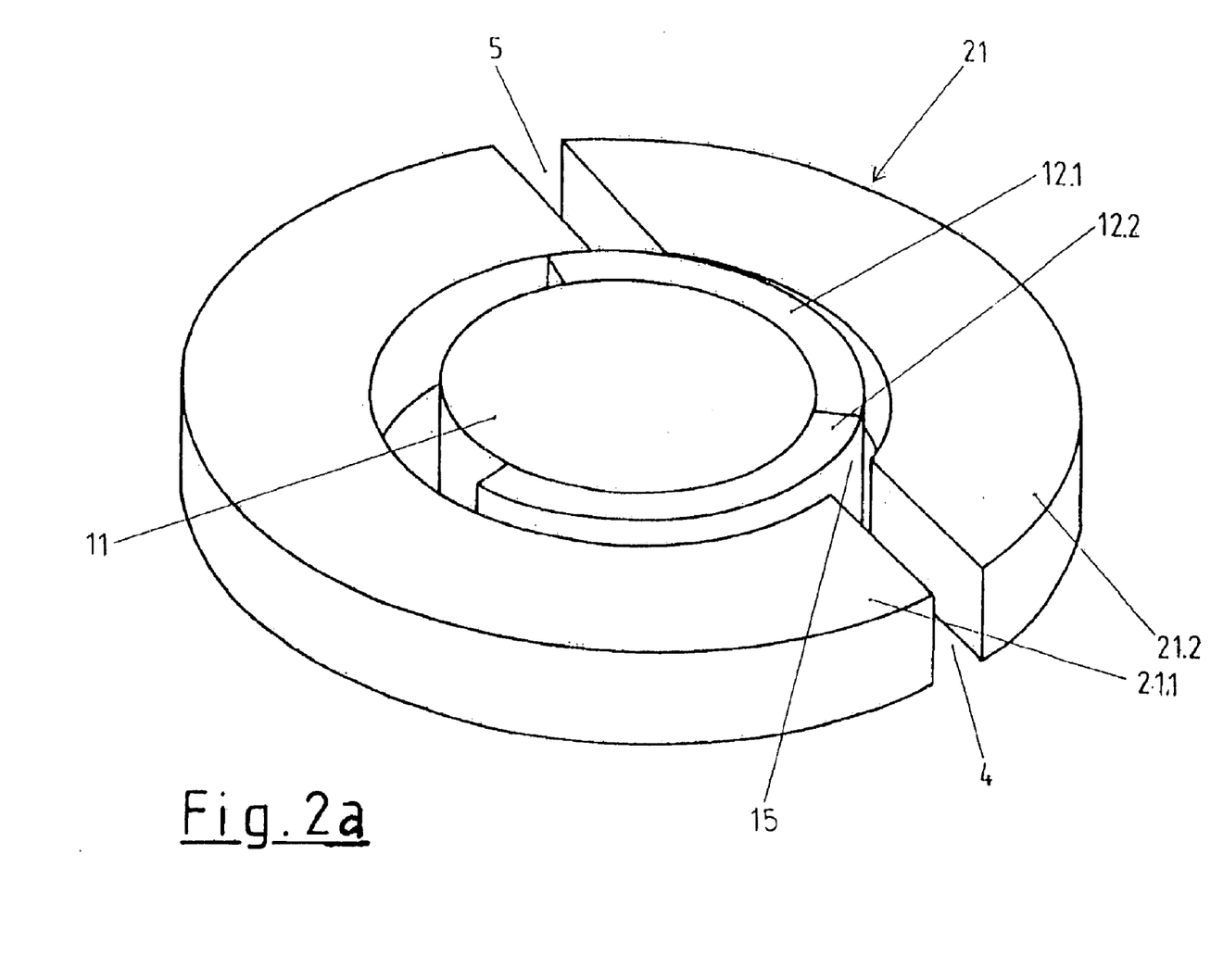
FIG. 2a is a schematic, perspective view of a wide-angle rotation angle sensor with a rotor unit and a stator unit.
Figure 2B:
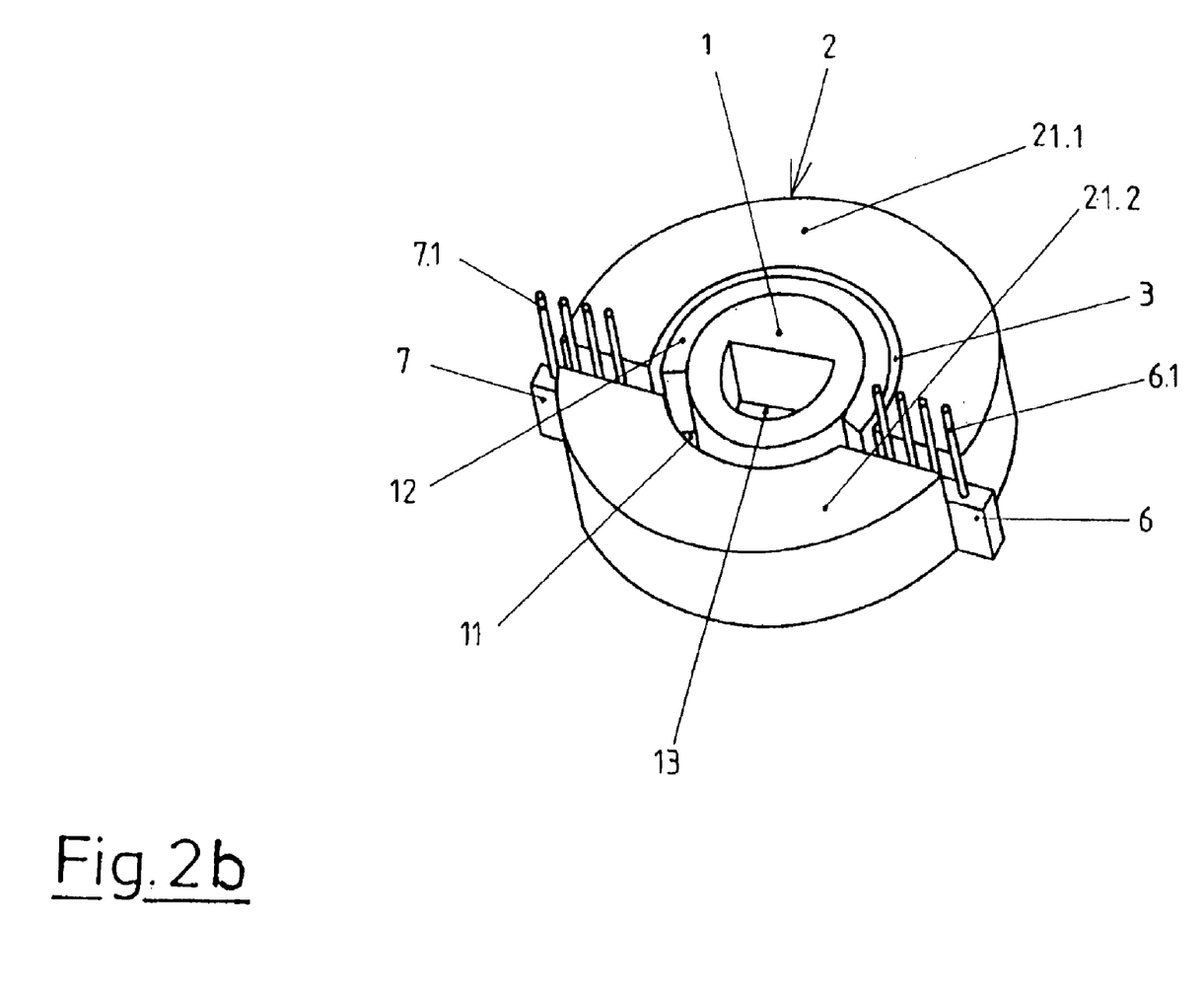
FIG. 2b is a bottom view of a wide-angle rotation angle sensor according to FIG. 2 with an installed Hall unit.
Figure 3:
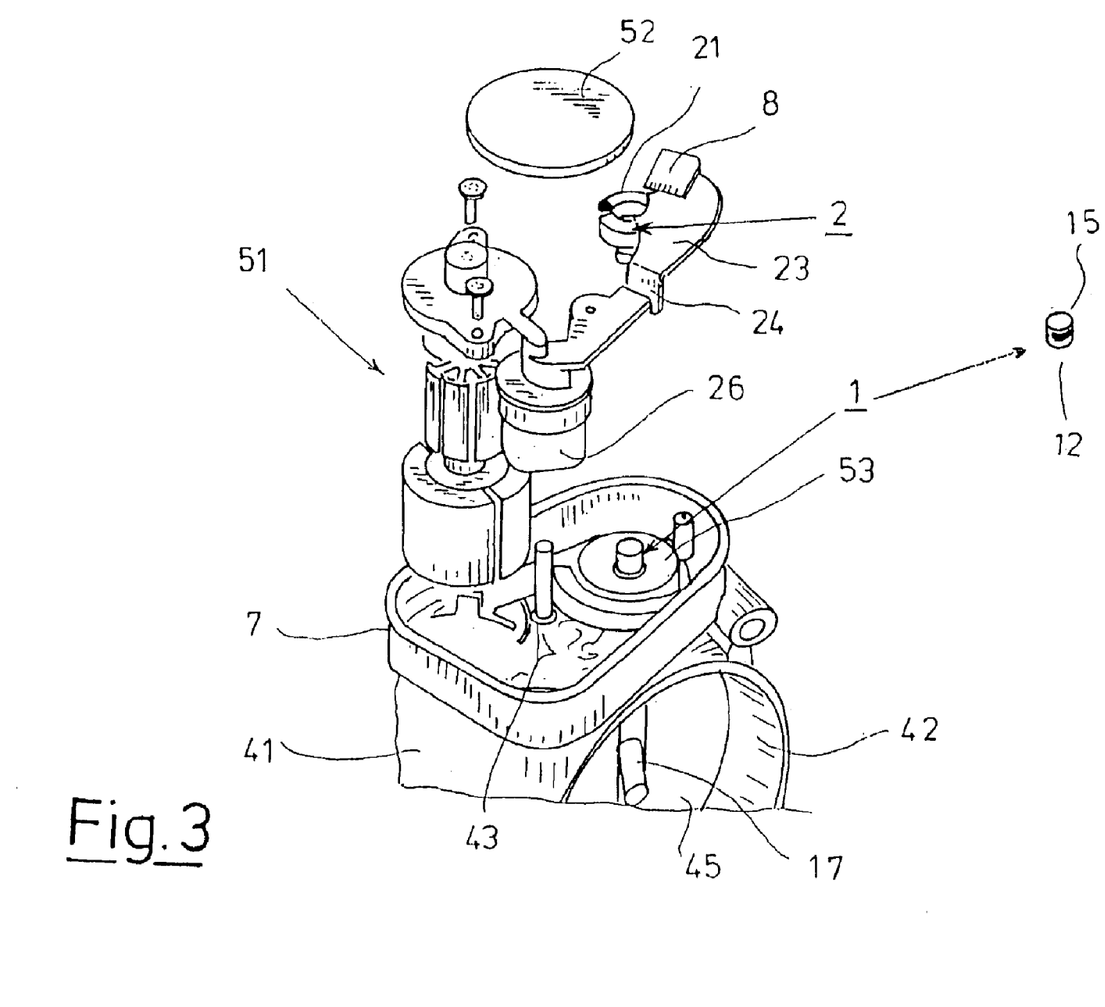
FIG. 3 is an exploded, perspective view of a wide-angle rotation angle sensor according to FIGS. 1a to 2b located in a damper flap unit.

FIGS. 1 to 3 show a wide-angle rotation angle sensor. It consists of:

a rotor unit 1, and a stator unit 2.

As especially FIGS. 2a and 2b show, the rotor unit 1 includes a magnet support element 11 made of a magnetically non-conducting material. The magnet support element 11 supports a magnet element 12 that consists of a north magnet segment element 12.1 and a south magnet segment element 12.2. The magnet segment elements 12.1, 12.2 each cover an angle range of about 120°.

FIG. 1a shows a first and FIG. 1b a second design of a stator unit. With both designs, the stator unit includes a stator element 21. The stator element 21 is divided into a large partial stator element 21.1 and located opposite to it a small partial stator element 21.2. A tangentially arranged spacing opening 4 and a tangentially arranged spacing opening 5 are left open between the two partial stator elements. In the example shown, the two spacing openings are located in one plane. The spacing openings 4,5 are designed as slots that are located between parallel end faces of the partial stator elements 21.1 211.2. Each slot does not run radially, i.e., in the direction to the center of the formed ring, but tangentially, i.e., they are located on a tangent of an imagined circle around the center of the ring.

The large stator element 21.1 exhibits two large stator fastening elements 21.1-B1 and 21.2-B2, which are located in a mirror image opposite to one another. With the first design according to FIG. 1a, openings can be inserted in each of the elements 21.1-B1 and 21.1-B2.

The small partial stator element 21.2 is designed in a similar fashion. Thus, it exhibits two small stator fastening elements 21.2-B1 and 21.2-B2, which are located opposite to one another, and in turn, in the first design according to FIG. 1a, each can exhibit openings. ASIC circuit elements 6, 7 that are connected with a pc-board element 8 are positioned in the two spacing openings 4, 5.

In the first design, the large and the small partial stator elements 21.1, 21.2 are punched from a thicker soft-iron sheet metal or formed from sintered soft iron.

On the other hand, the stator elements 21.1 and 21.2 in the second design according to FIG. 1b are built from individual metal sheets 23' that are stacked on top of one another. Textured sheet metal or the like is used. Their manner of manufacturing and processing is known from transformer construction.

The special sheets are cut and can be provided with embossings 22'. The sheets 23' are then heated in an annealing furnace at such a temperature, where the stresses of the crystalline structure that build up during processing are eliminated. It has been shown that such stresses are eliminated by heating to temperatures preferably in a range between 700 and 1100° C. Preferably, this annealing step is carried out under a protective atmosphere (e.g., nitrogen) or under vacuum.

The crystalline structure is also changed by openings. The openings also disturb the homogeneity of the magnetic flux. For this reason, joining the sheets using bolts is avoided. Thus, no openings are provided in the stator fastening elements 21.1-B1, 21.2-B2, 21.2-B1 and 21.2-B2 of the second design.

Surprisingly, it has shown that the individual sheets hold together via their embossings 22', simply by pressing them together. The structure of the formed composite is shown in FIG. 1c. The pressed together block then acts as one body. The possible increase in losses caused by pressing can be eliminated through the annealing step.

In addition to the bond achieved using the embossings, the individual sheets can also be held together using a paint cover.

The particular advantage of the manufacture of the elements 21.1, 21.2 according to the second design of metal sheets consists of a significant reduction in manufacturing costs, an optimal adaptation to the required height, a loss-free conductance of the magnetic flux such that the most exact output voltages are generated.

As especially FIGS. 1a, 1b and 2b show, the ASIC circuit elements 6, 7 exhibit connector elements 6.1 and 7.1 for their connection to the pc-board element 8.

Assembly of the wide-angle rotation angle sensor is carried out as follows:

The two partial stator elements 21.1 and 21.2 are molded into a stator support unit 23. The stator support unit 23 (cf. FIG. 3) may be the housing of a throttle valve for an internal combustion engine, for example. The stator support unit 23 is made of a synthetic material. It is, thus, possible to mold in the large partial stator element 21.1 and the small partial stator element 21.2 in the proper position. Thereafter, the pc-board element 8 with the two ASIC circuit elements 6, 7 is installed such that the two ASIC circuit elements 6, 7 are pushed into the openings 4, 5. Due to the fact that the two ASIC circuit elements 6, 7 are connected to the pc-board element 8, they are positioned in the correct position in the spacing openings 4, 5.

With the rotor unit 1, the magnet element 12 is supported using a support component 15 made of a synthetic material around the magnet support unit 11, which exhibits a shaft support opening 13. To this end, the two partial magnet segment elements 12.1 and 12.2 are at least partially molded into the support component 15 with a magnet support unit 11, such that the north magnet segment element 12.1 and the south magnet segment element 12.2 are supported in their proper position by the magnet support element 11 at the rotor element. The magnet support element 11 assumes the conventional role of a yoke. The magnet segment elements 12.1 and 12.2 are molded into a synthetic material.

In an alternative design (not shown), the magnet element 12 is supported by a strip element at the magnet support element 11.

During the assembly of the wide-angle rotation angle sensor (cf. FIG. 3) the magnet element 12 with the magnet support element 11 held in the support component 15 is attached to throttle valve shaft 17 that protrudes into a housing component 9 of a throttle valve unit. A support profile 24 secures and facilitates positioning of the stator unit 2 such that the stator element 21 can be positioned opposite the ring magnet element 12 while maintaining an air gap. A connector unit 26 is inserted into a plug receptacle 28 and a drive unit 51 into a drive housing 43. For illustration purposes, the pc-board element 8 is here shown laying on a synthetic component 23. The ASIC circuit elements 6, 7 are placed in an adjusted manner into the spacing openings 4, 5, and the pc-board element 8 is already connected to the connector unit. A motor of the drive unit 51 can be installed with the carbon brushes adjusted to the correct position and the motor shaft.

Finally, a gear wheel 53 is placed onto a pin 44 such that the drive unit is complete as well. A cover is placed on the housing component with the installed wide-angle rotation angle sensor and the housing component is closed.

A punched grid with several metal rails laying adjacent to one another crosses the support profile 24 from the connector unit 26 to the pc-board element 8. At the spot with the designation 24, the punched grid exhibits an expansion loop for absorbing changes in length. The synthetic component 23 surrounds the punched grid such that the partial stator elements 21.1 and 21.2 are held at the appropriate position with the spacing openings 4, 5.

The fastening elements 21.1-B1, . . . , 21.2-B2 ensure that the partial stator elements are securely held in the synthetic component of the one part of the support profile 24.

An additional part of the support profile 24 made of synthetics is formed together with the housing of the connector unit 26, such that the expansion loop remains free and able to perform its function in the punched grid.

Figure 4A:
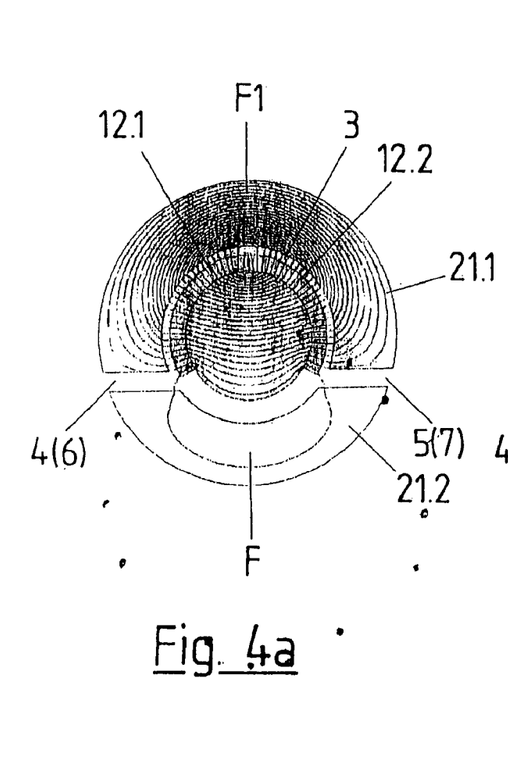
FIGS. 4a–4c the magnetic flux profiles of a wide-angle rotation angle sensor according to FIGS. 1 to 3 at various positions of the rotor unit.
Figure 4B:
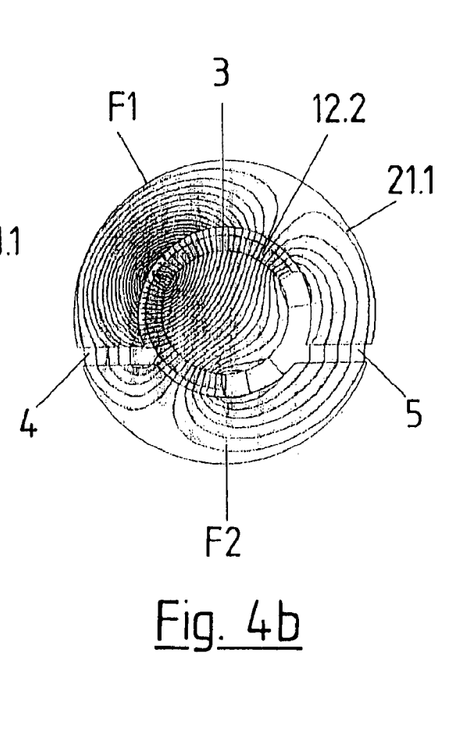
Figure 4C:
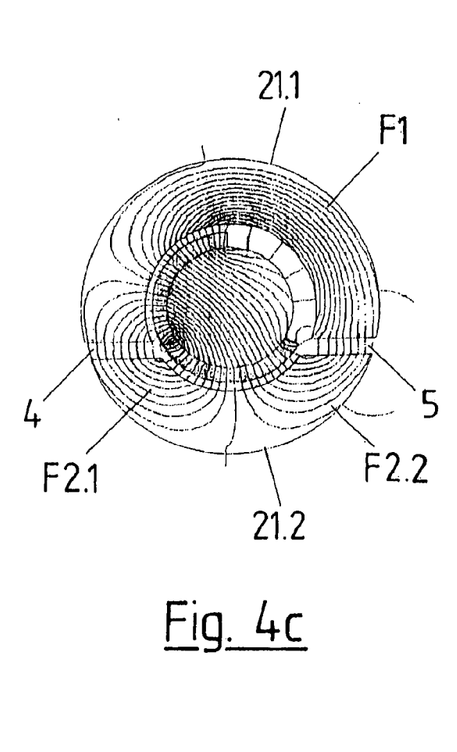

The function of the wide-angle rotation angle sensor will be explained based on FIGS. 4a to 5c. FIGS. 4a to 4c show various positions of the rotor unit 1 in relation to the stator unit 2.

In the 0° position according to FIG. 4a, the north magnet segment element 12.1 and the south magnet segment element 12.2 are located between the two spacing openings 4, 5. Thus, a main magnetic flux F1 flows mainly in the large stator element 21.1, through an air gap 3 that is situated between the rotor unit 1 and the stator unit 2, and through the magnet support element 11.

The rotor unit 1 is then moved in relation to the stator unit 2 to the +60° position according to FIG. 4b. In this position, the main magnetic flux F1 flows through the large stator element 21.1, at least partially through the spacing opening 4 and closes via the air gap 3 and the magnet support element 11. In addition, an ancillary magnetic flux $F_2$ is formed, which flows through the small stator element 21.2, the spacing opening 5, and thus through the ASIC circuit element 7 and partially through the large partial stator element 21.1.

In the next step, the rotor unit 1 is turned in relation to the stator unit 2 to the +120° position according to FIG. 4c. In this position, the main magnetic flux F1 flows essentially through the large partial stator element 21.2 and is closed via the air gap 3 and the magnet support element 11. The main magnetic flux F1 penetrates the spacing opening 5 and the ASIC circuit element 7. The ancillary magnetic flux F2, on the other hand, splits into a partial ancillary magnetic flux F2.1 that flows essentially around the spacing opening 4 and a partial ancillary magnetic flux F2.2, which flows essentially around the spacing opening 5. The two ancillary magnetic fluxes are of equal size.

Figure 5A:
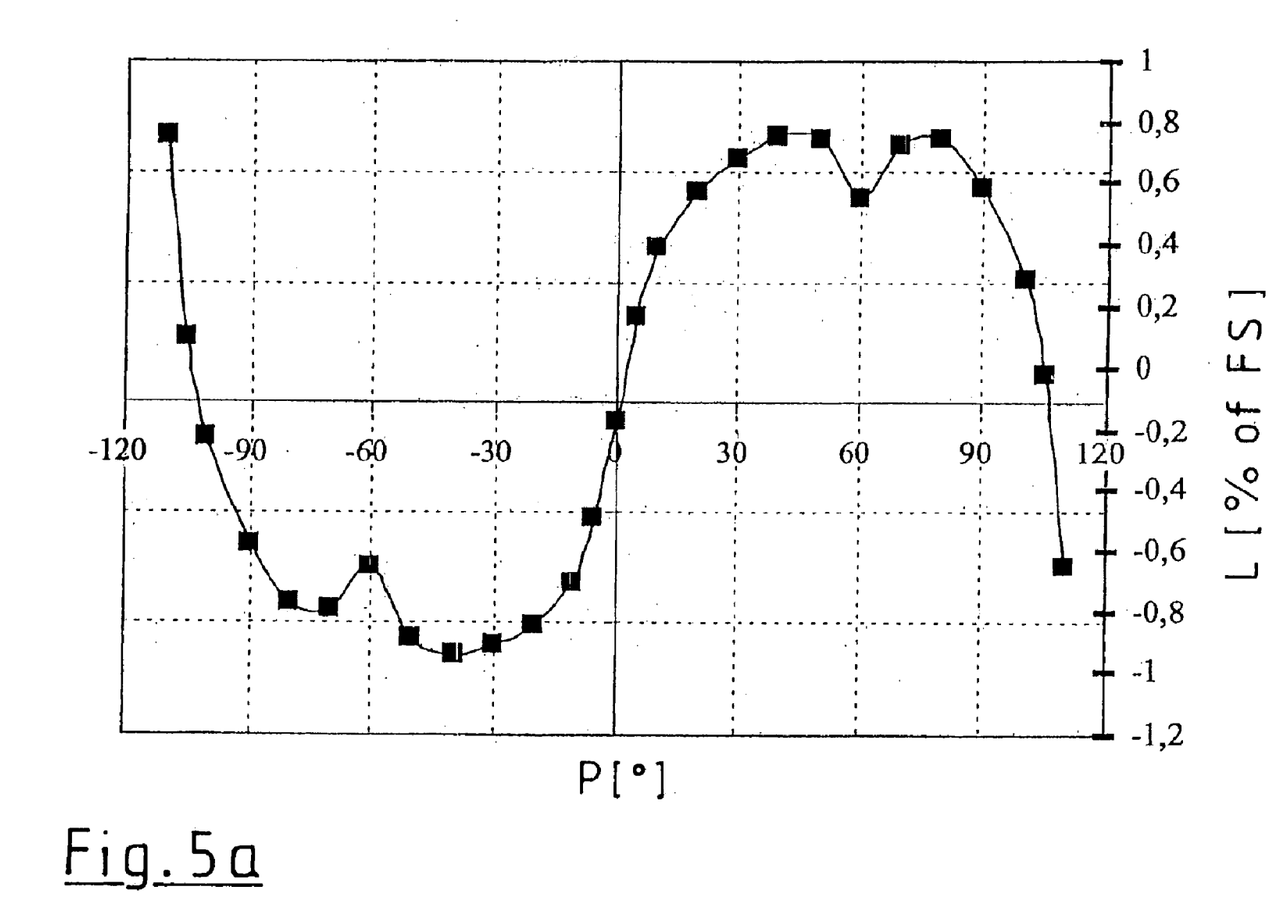
FIGS. 5a–5d are schematic presentations of various signal profiles of a wide-angle rotation angle sensor according to FIGS. 1 to 4c, respectively.

As FIG. 5a shows, a linearity L has an essentially sinus-shaped profile in relation to a position P during the movement between 0° and 120°, which is system-related.

Figure 5B:
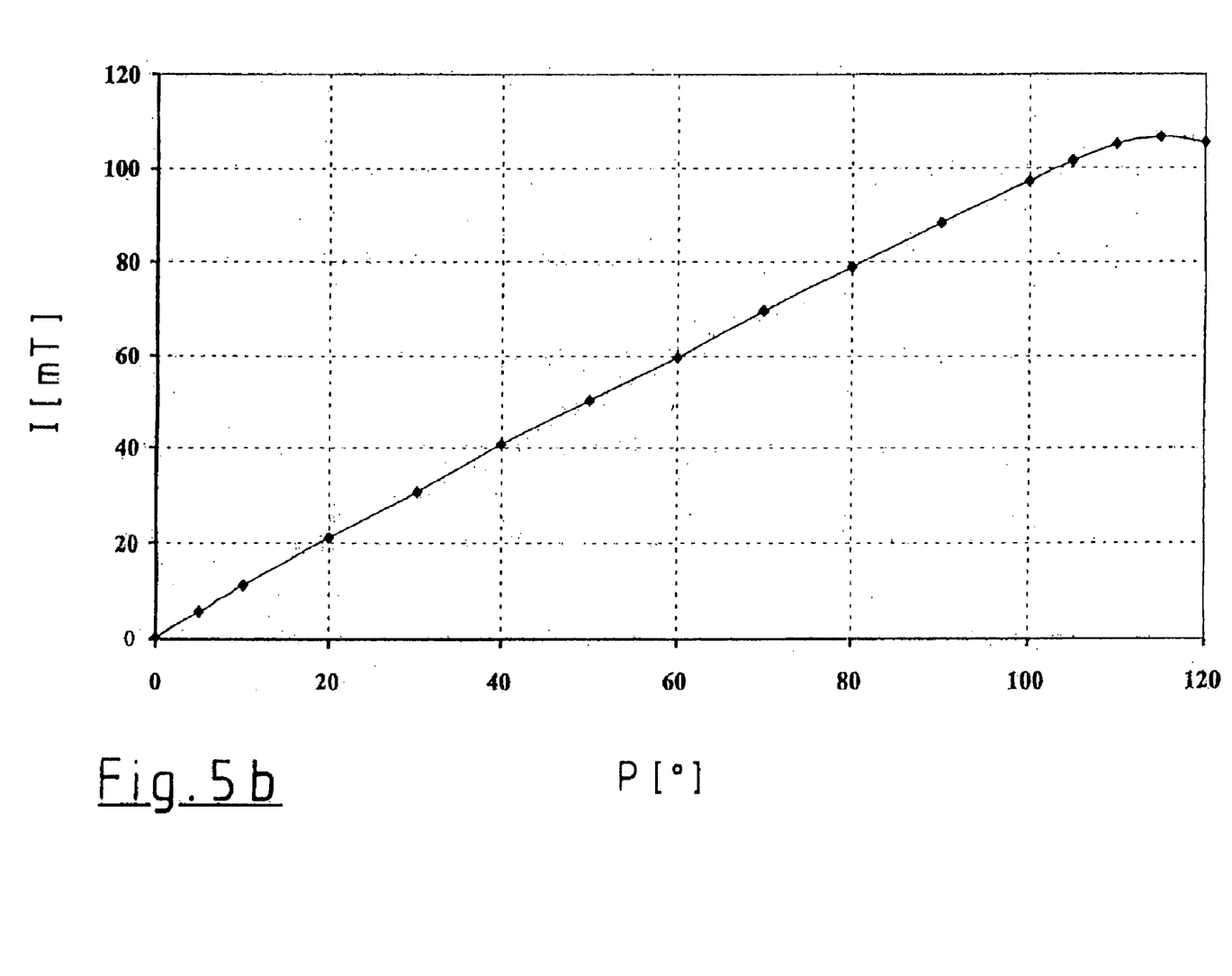

However, it is essential that the induction I within a spacing opening (in mT) has an essentially linear profile in relation to the position P (in degrees from 0° to 120°), as FIG. 5b indicates.

Figure 5C:
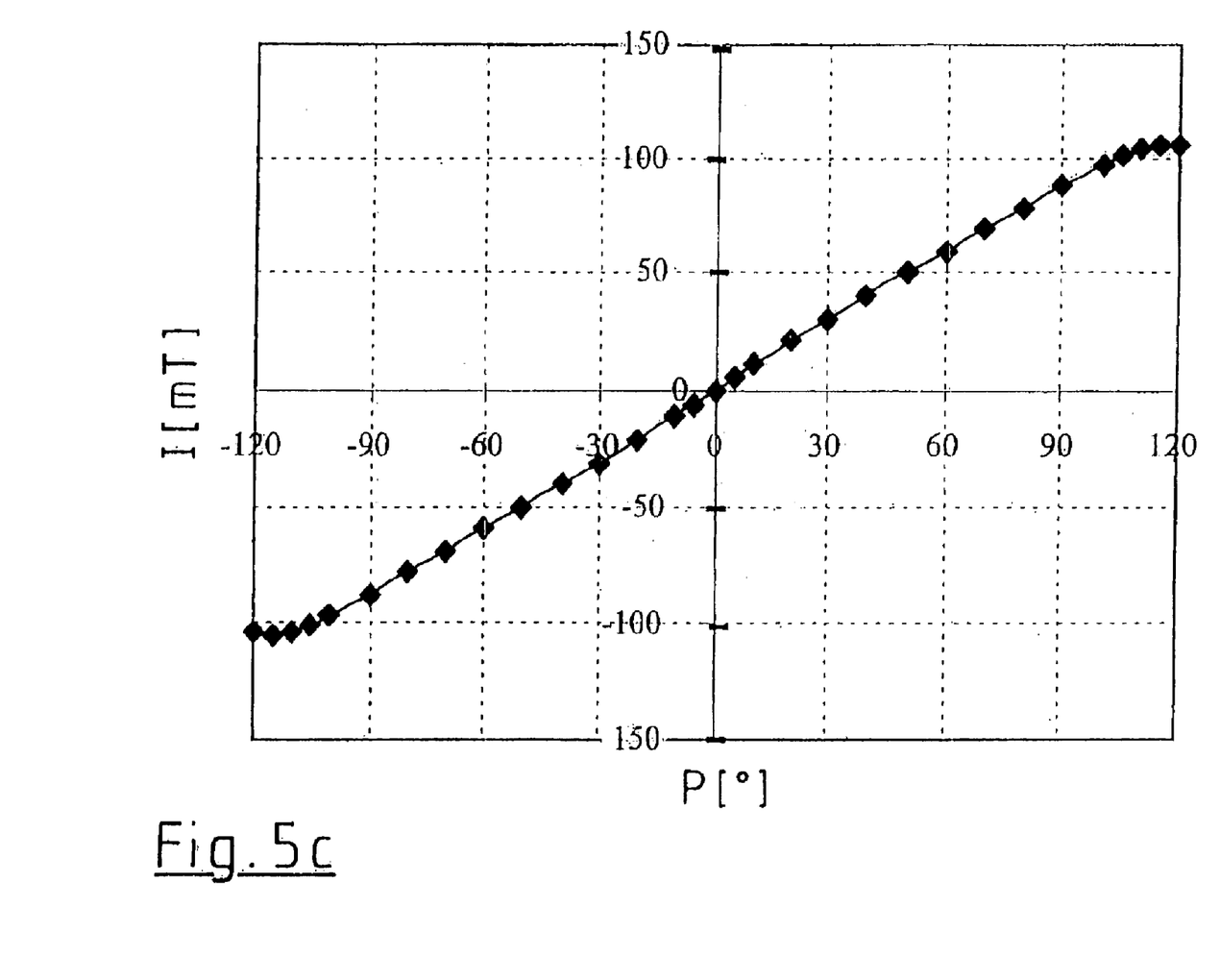

Due to this, it is possible to generate an output signal at a rotation of the rotor unit in both rotational directions, as shown in FIG. 5c. That is, an output signal is generated corresponding to the induction, which is linear between −120° and +120°. In this manner, it is possible to linearly measure the angle from −120° and +120° that is assumed between the rotor unit 1 and the stator unit 2 without a break. Due to the linear measurement, it is possible to accurately determine the respective position and to use the obtained signal for further processing.

Figure 5D:
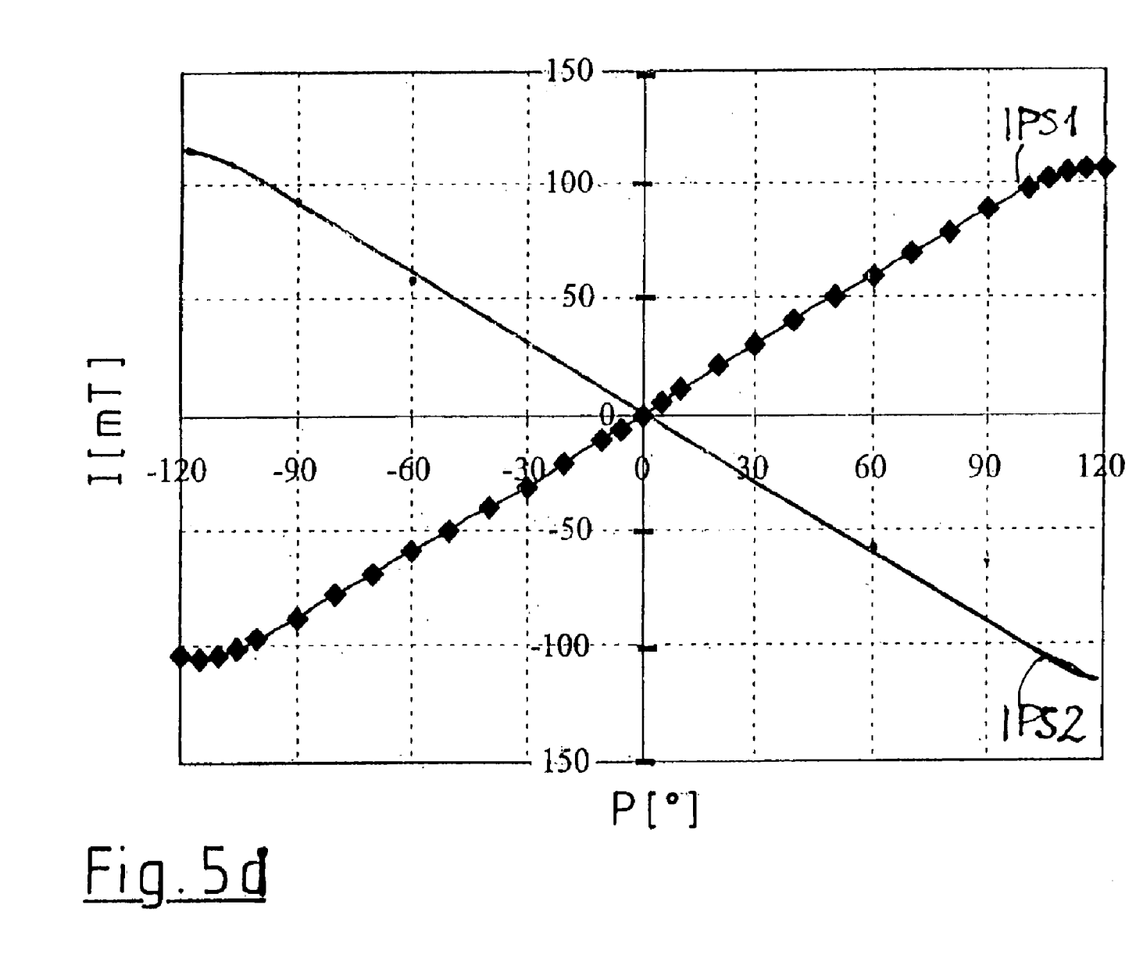

The output signal in FIG. 5d is output with the same curve shape from ASICs 6 and 7.

The two ASICs 6 and 7 are designed as circuit elements that exhibit at least one Hall element, one computation unit, a read/write (RAM) memory and a read (ROM) memory. To be able to adjust the output curves IPS1 and IPS2 with regard to pitch and/or linearity, correction values are provided to the RAM via the connector unit using the computation unit. The correction values are retrieved in fine increments. If the entered correction values lead to the desired adjustment result, they are provided from the RAM to the ROM using the computation unit. For this purpose, the read-only memory ROM is designed as an EEPROM, which allows for a re-adjustment if required.

Using the ASICs 6, 7, output curves IPS1, IPS2 that run in opposite directions can be generated in one of three ways:
1. Using correction values,
2. By rotating the ASIC 7 in its spacing opening 5 by 180° in relation to ASIC 6,
3. By rotating the ASIC 7 by 180° in relation to ASIC 6 and by using correction values.

Using the third option can generate very accurate output curves. These output curves can be used to monitor operating parameters such as supply voltages, in particular voltage fluctuations, short circuits, ground shorts, etc., supply currents, etc.

To this end, the two ASICs are connected to a common voltage supply.

Figure 6:
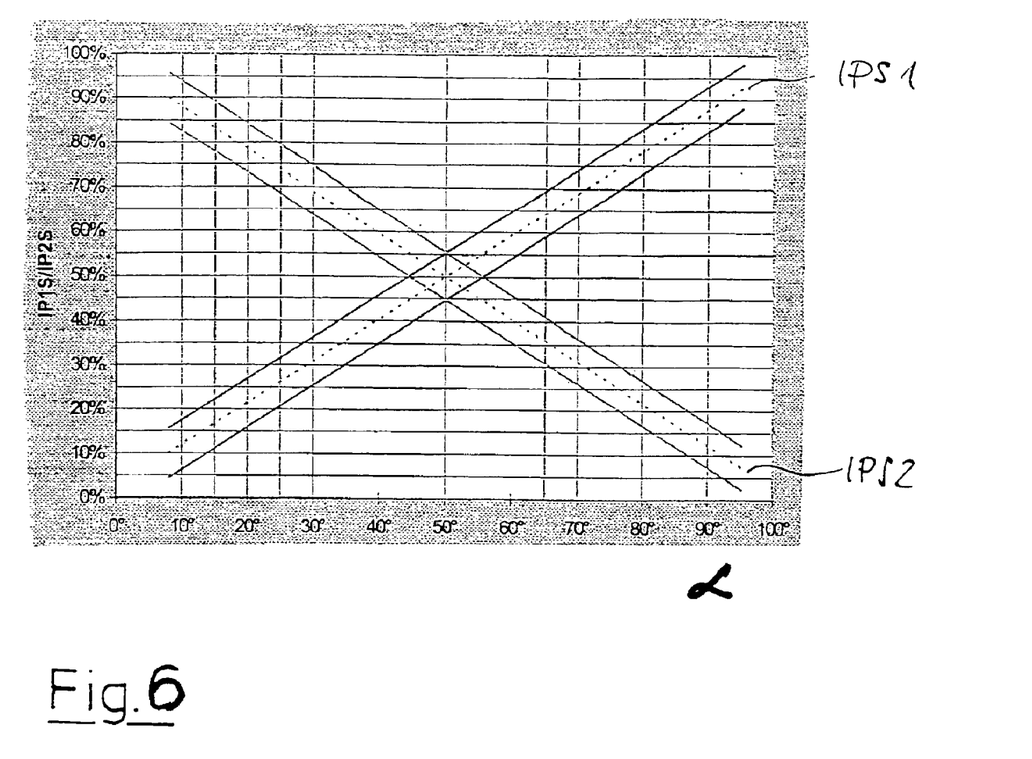
FIG. 6 shows signal profiles for a monitoring function.

If the throttle valve shaft 17 turns at an angle α as shown in FIG. 6, the output curve IPS1 rises while the output curve IPS2 drops by the same amount. IPS1 and IPS2 intersect at 50°. While IPS1 rises at α=90° to about 95%, IPS2 drops to about 5%.

Fluctuations in the common supply voltage result in deviating curve profiles. Possible deviations are shown in both directions. If deviations that are outside the possible deviations occur during normal operation, these values are evaluated by the central computation unit as failures and are displayed, reported or emergency measures are initiated corresponding to a specified evaluation mode.

The particular advantage of the use of a wide-angle sensor for such a monitoring task is that precise output curves IPS1 and IPS2 and their deviations are generated that enable dependable monitoring. Errors are captured as described that are not influenced by potential internal errors as can be the case with resistor units, for example.

There has thus been shown and described a novel wide-angle rotation angle sensor which fulfills all the objects and advantages sought therefor. Many changes, modifications, variations and other uses and applications of the subject invention will, however, become apparent to those skilled in the art after considering this specification and the accompanying drawing which discloses the preferred embodiment thereof. All such changes, modifications, variations and other uses and applications which do not depart from the spirit and scope of the invention are deemed to be covered by the invention, which is to be limited only by the claims which follow.

What is claimed is:

1. A In a device for the contact-free measurement of the rotary movement of components moving relative to one another with comprising:
   (a) an asymmetrically built stator unit comprising two partial stator elements that leave empty two spacing openings between them,
   (b) at least one Hall unit is located in at least one spacing opening,
   (c) the partial stator elements forming a partial ring comprising a large partial stator element and a small partial stator element, wherein the large partial stator element covers a range of more than 180° and the small partial stator element a range of less than 180° of a circular arc of said ring, and
   (d) a rotor unit comprising a magnet element that is supported by a magnet support element and that can be moved relative to the stator elements while maintaining an air gap, wherein the magnet element consists of two magnetically bipolar magnet segment elements that are at least partially arranged in a first part made of a magnetically non-conducting material, the improvement wherein
   (1) the two spacing openings between the large partial stator element and the small partial stator element extend along a tangent of an imagined circle around the center of the ring,
   (2) the large and the small partial stator elements are at least partially molded into a second part that is made of a magnetically non-conducting material, and
   (3) the magnet element comprises two essentially equally long magnetically bi-polar partial magnet segment elements that each cover a range of 90° or more, wherein the partial magnet segment elements are at least partially molded into the first part.

2. A device as set forth in claim 1, wherein the Hall unit located in one or both of the spacing openings is connected to a pc-board element.

3. A device as set forth in claim 1, wherein the large and the small partial stator elements exhibit protrusions of the partial stator elements in the area of the spacing openings between a large and a small stator element.

4. A device as set forth in claim 1, wherein the large partial stator element and the small partial stator element each exhibit at least one stator fastening element.

5. A device as set forth in claim 1, wherein two large stator fastening elements are located in a mirror image opposite to one another at the large partial stator element.

6. A device as set forth in claim 1, wherein two small stator fastening elements are located in a mirror image opposite to one another at the small partial stator element.

7. A device as set forth in claim 1, wherein the partial magnet segment elements are supported at a magnet support unit using a strip element, which at least partially encloses said magnet segment elements.

8. A device as set forth in claim 1, wherein the partial magnet segment elements are at least partially molded into a support component that is connected to a throttle valve shaft.

9. A device as set forth in claim 1, wherein one magnet segment element is a north magnet segment element and the other is a south magnet segment element.

10. A device as set forth in claim 1, wherein the second part is at least one of a partial throttle valve housing and a support profile, and the first part is connected to a throttle valve shaft.

11. A device as set forth in claim 1, wherein the large and the small partial stator elements are made of a magnetically conductive material.

12. A device as set forth in claim 11, wherein the magnetically conductive material is selected from the group consisting of sintered iron and a punched soft-iron sheet.

13. A device as set forth in claim 1, wherein the large and the small stator elements comprise stacked metal sheets.

14. A device as set forth in claim 13, wherein at least one embossing is formed into the metal sheets.

15. A device as set forth in claim 14, wherein the stacked metal sheets are held together by said embossings.

16. A device as set forth in claim 13, wherein the metal sheets are textured metal sheets.

17. A device as set forth in claim 1, wherein at least one of the first and the second part is made of synthetic material.

18. A device as set forth in claim 1, wherein a first Hall unit is arranged in a first spacing opening and a second Hall unit in a second spacing opening.

19. A device as set forth in claim 18, wherein the second Hall unit is arranged in the second spacing opening offset in relation to the first Hall unit in the first spacing opening by an angle selected from the group consisting of 0° to 180°.

20. A device as set forth in claim 18, wherein the first and the second Hall units are designed as an ASIC circuit element that incorporates at least one Hall device.

21. A device as set forth in claim 20, wherein the ASIC circuit element exhibits, in addition to the Hall device, at least one read only memory (ROM) and one read/write memory (RAM) that are connected to at least one computation unit.

22. A method for monitoring an alterable operating parameter comprising the steps of
  (a) capturing the degree of actuation of at least one of an accelerator pedal or of a throttle valve using at least two ASIC circuit elements with a common voltage supply as measuring devices for the contact-free measurement of a rotary movement, thereby generating an output signal representing an output curve for each of said measuring devices representing the degree of actuation, where said output curves of said measuring devices differ in slope from each other, and
  (b) calculating a deviation between said output curves from said output signals, and, if said deviation exceeds a specified tolerance range, outputting a failure signal.

23. A method as set forth in claim 22, wherein the output curves (IPS1, IPS2) are substantially linearly between two extreme values with different slopes across the entire range of the degree of actuation.

24. A method as set forth in claim 22, wherein the output curves (IPS1, IPS2) are substantially linear between two extreme values with slopes in opposite directions across the entire range of the degree of actuation.

25. A method as set forth in claim 22, further comprising the step of providing the output signals representing the output curves (IPS1, IPS2) and their deviations to a computation unit, that determines deviations that exceed specified tolerance ranges and outputs a signal representing failure of the operating parameter.

* * * * *